United States Patent
Giordano et al.

(10) Patent No.: US 11,448,336 B2
(45) Date of Patent: Sep. 20, 2022

(54) VALVE FOR FLUIDS, PREFERABLY FOR GASES

(71) Applicant: GIORDANO CONTROLS S.p.A., Villa Bartolomea (IT)

(72) Inventors: Bruno Giordano, Villa Bartolomea (IT); Morgan Giraldo, Codevigo (IT)

(73) Assignee: GIORDANO CONTROLS S.p.A., Villa Bartolomea (IT)

( * ) Notice: Subject to any disclaimer, the term of this patent is extended or adjusted under 35 U.S.C. 154(b) by 0 days.

(21) Appl. No.: 17/058,598

(22) PCT Filed: May 31, 2019

(86) PCT No.: PCT/IB2019/054524
§ 371 (c)(1),
(2) Date: Nov. 24, 2020

(87) PCT Pub. No.: WO2019/229712
PCT Pub. Date: Dec. 5, 2019

(65) Prior Publication Data
US 2021/0140559 A1    May 13, 2021

(30) Foreign Application Priority Data
May 31, 2018  (IT) .................. 102018000005897

(51) Int. Cl.
*F16K 39/02*    (2006.01)
*F16K 41/12*    (2006.01)
(Continued)

(52) U.S. Cl.
CPC .......... *F16K 31/0655* (2013.01); *F16K 1/443* (2013.01); *F16K 39/022* (2013.01); *F16K 41/12* (2013.01)

(58) Field of Classification Search
CPC ..... Y10T 137/88062; Y10T 137/88046; Y10T 137/87989; Y10T 137/88005;
(Continued)

(56) References Cited

U.S. PATENT DOCUMENTS 2,491,905 A * 12/1949 Ray ................... F25B 41/31
                                                        62/524
3,606,241 A *  9/1971 Bornholdt ............... H01F 7/088
                                                        251/52
(Continued)

FOREIGN PATENT DOCUMENTS

| | | |
|---|---|---|
| EP | 0928892 A1 | 7/1999 |
| EP | 3070381 A1 | 9/2016 |
| WO | 2015/111088 A1 | 7/2015 |

OTHER PUBLICATIONS

International Preliminary Report on Patentability for International Application No. PCT/IB2019/054524, dated Feb. 14, 2020 in 18 pages.

*Primary Examiner* — Matthew W Jellett
(74) *Attorney, Agent, or Firm* — Knobbe, Martens, Olson & Bear, LLP (57) ABSTRACT

A valve (1) for fluids, preferably for gases, comprising an inlet passage (2); an outlet passage (3); a shutter (4) interposed between the inlet passage (2) and the outlet passage (3) and movable between an open position and a closed position; actuating means (5) operatively active on the shutter (4); and a first stabilisation membrane (6) interposed between the shutter (4) and a fixed portion (7) of the valve (1). The first stabilisation membrane (6) exposes an active wall (8) to the fluid, which has an outer surface (9) shaped in such a way that the pressure of the fluid acting on the active wall (8) is lower than the pressure of the fluid acting on the rear surface (10) of the shutter (4), preventing the fluid from opening the shutter (4), when the shutter (4) is in
(Continued)

the closed position and when the valve (1) is in a back pressure condition.

22 Claims, 7 Drawing Sheets (51) Int. Cl.
*F16K 31/06* (2006.01)
*F16K 1/44* (2006.01)

(58) Field of Classification Search
CPC ....... Y10T 137/87981; Y10T 137/1516; F16K 1/443; F16K 39/022; F16K 31/0658; F16K 31/0693; F16K 27/029; G05D 16/2095; H01F 7/128; H01F 7/16; H01F 7/081; H01F 7/1638
See application file for complete search history.

(56) References Cited

U.S. PATENT DOCUMENTS

| | | | | |
|---|---|---|---|---|
| 4,796,854 | A * | 1/1989 | Ewing | F16K 31/0693 251/129.07 |
| 4,998,561 | A * | 3/1991 | Morozumi | F16K 31/0693 137/630.14 |
| 5,586,575 | A * | 12/1996 | Bergamini | F15B 13/0438 137/488 |
| 5,979,484 | A * | 11/1999 | Grando | F23N 5/107 137/66 |
| 6,234,189 | B1 * | 5/2001 | Koch | F23K 5/007 137/66 |
| 2016/0279376 | A1 | 9/2016 | Cewers | |

* cited by examiner

VALVE FOR FLUIDS, PREFERABLY FOR GASES

CROSS-REFERENCE TO RELATED APPLICATIONS

This application is the U.S. National Phase under 35. U.S.C. § 371 of International Application PCT/IB2019/054524, filed May 31, 2019, which claims priority to Italian Patent Application No. 102018000005897, filed May 31, 2018. The disclosures of the above-described applications are hereby incorporated by reference in their entirety.

TECHNICAL FIELD

The present invention relates to a valve for fluids. In particular, the present valve is used for intercepting gasses at a burner, but could be used in any sector for intercepting, in general, a fluid. Moreover, the present invention relates to a valve of the type having one or more consecutive and independent stages or a single-stage valve.

PRIOR ART

Electromechanical actuators, often also defined as "solenoid valves" are electromechanical components interposed along a pipeline to allow the interception or the adjustment of the flow rate and/or the pressure of a fluid (liquid or gaseous) of interest made to flow in the pipeline.

The management of the quantity of fluid passing through the solenoid valve, and therefore along the pipeline, takes place through the control of the movement of a shutter having a high operating precision that allows the solenoid valves to also be used as safety devices.

An example of this type of device is reported in the documents EP3070381, WO2015/111087 and WO2015/111088, in which a solenoid valve is illustrated having multiple stages cooperating for the adjustment of the quantity of gas that can be transported through the pipeline.

Solenoid valves must have certain characteristics capable of ensuring a high level of safety, such that they can be approved and are therefore able to be used.

To check the possible degree of safety that they can provide in the event of a malfunction, a specific test to which they are subjected is the so-called "back pressure test". In this test, the fluid in question is made to flow from the outlet opening of the valve to the inlet opening, i.e. in the opposite direction with respect to the normal use of the valve.

During the test, the shutter interposed between the accesses of the valve must ensure a perfect seal, preventing the fluid from reaching the inlet opening.

Moreover, there are also other safety tests such as that involving the removal of the stabilisation membrane and the entry of the gas from the inlet passage.

The increase in the safety class of solenoid valves leads to an increase in the pressure required for the back-pressure test. To overcome tests with higher pressures, therefore, it is necessary to increase the closing force of the elements inside the valve. All this involves an increase in the energy necessary for the activation of the operators in the normal use of the same.

However, given the high pressure of the fluid during these tests and/or in case of a malfunction, and given the increasingly restrictive thresholds to ensure safety, in certain situations the suitability for use is not achieved.

In fact, given the high pressure of the fluid during these tests and/or in the event of a malfunction, the shutter is subject to different pressing forces able to move it from its closed position, with the consequence of reducing the degree of safety offered by the valve.

OBJECT OF THE INVENTION

In this context, the technical task of the present invention is to propose a valve for fluids, preferably for gases, which obviates the drawback of the known art as mentioned above.

In particular, the object of the present invention is to provide a valve for fluids able to ensure a high level of safety at least during back pressure tests or with the removal of the stabilisation membrane.

The stated technical task and specified object are substantially achieved by a valve for fluids, preferably for gases, which comprises the technical features set forth in the independent claim. The dependent claims correspond to further advantageous aspects of the invention.

It should be highlighted that this summary introduces, in simplified form, a selection of concepts which will be further elaborated in the detailed description given below.

The invention relates to a valve for fluids, preferably for gases, which comprises an inlet passage for a fluid, an outlet passage for the fluid, a shutter interposed between these passages and movable along a movement direction between an open position and a closed position. In the open position the shutter allows the flow of the gas from the inlet passage to the outlet passage, while in the closed position the shutter prevents the flow of the gas.

Furthermore, the valve for fluids comprises actuating means movable along the movement direction and operatively active on the shutter for moving the shutter into the open position, and a first stabilisation membrane interposed between the shutter and a fixed portion of the valve in such a way as to expose an active wall to the fluid present between the outlet passage and the shutter.

Specifically, the active wall has an outer surface arranged at the outlet passage and facing towards a rear surface of the shutter, which is opposite the inlet passage of the valve. The outer surface is conformed so that the pressure of the fluid acting on said active wall generates a force that is lower than the force generated by the pressure of the fluid acting on the rear surface of the shutter, so as to prevent the pressurised fluid from being able to open the shutter when the latter is in the closed position and the valve is at the same time in a back pressure condition, i.e. a condition in which the fluid flows from the outlet passage towards the inlet passage.

Advantageously, both in the case of a back pressure test and in the case of a malfunction, the first stabilisation membrane of the valve is able to reduce the pressure of the fluid acting on the shutter to prevent the latter from moving into the open position, allowing the counterflow of the fluid.

Preferably, the actuating means extends along an axis of extension parallel to the movement direction.

According to one aspect of the invention, the first stabilisation membrane surrounds the axis of extension, lying on a plane substantially orthogonal to the axis of extension itself.

Preferably, the active wall is inclined with respect to the axis of extension towards a common portion of the shutter.

In this way the stabilisation membrane assumes an advantageous conformation like a cone or a truncated cone, in which the protrusion of the outer surface of the active wall of the membrane is smaller than the rear surface of the turned shutter. Consequently, this configuration provides that the pressing forces induced by the gas on the active wall and on the shutter are unbalanced in favour of the latter, keeping it in the closed position also in the case in which the fluid flows from the outlet passage towards the inlet passage (back pressure).

Even more preferably, the first stabilisation membrane is of the bellows type for following the movement of the actuating means along the movement direction.

According to a different aspect of the invention, the active wall has a concavity that extends away from the shutter substantially along the movement direction.

According to another aspect of the invention, the first stabilisation membrane comprises a sleeve connected to the active wall and arranged adjacent to at least part of the actuating means for being constrained to the latter at the shutter.

Advantageously, the sleeve allows good adhesion with the actuating means, in such a way that the stabilisation membrane is able to remain integral with the actuating means itself during the movement of the shutter between the closed position and the open position.

According to one aspect of the invention, the valve comprises an elastic element interposed between the fixed portion of the valve and the shutter for moving and/or keeping the shutter itself in the closed position.

The elastic element, preferably a spring working in extension, allows moving and/or keeping the shutter in the closed position, being able to apply a pressing force directly on the rear surface of the shutter, distancing it from the stabilisation membrane.

Preferably, the first stabilisation membrane has a connecting portion arranged between the elastic element and the fixed portion.

Thanks to the presence of the elastic element, which produces pressing forces on both the shutter and on the fixed portion of the valve, it is possible to keep the stabilisation membrane in a stable position with respect to the fixed portion of the valve by interposing a connecting portion of the membrane directly between the fixed portion and the elastic element in tension.

According to one aspect of the invention, the valve comprises a primary volume defined between the inlet passage and the outlet passage, and a secondary volume arranged along the movement direction and separated from the primary volume by the first stabilisation membrane.

Substantially, the primary volume identifies a first stage of the valve, while the secondary volume identifies a second stage.

Most of the fluid flows inside the primary volume and it comprises some parts of the valve, such as the shutter, elastic elements and any other devices that are useful for its operation. Further components are arranged in the secondary volume; this volume is arranged separately and substantially transverse to the primary volume.

Preferably, the valve comprises a second stabilisation membrane arranged snap-fitted into the secondary volume for splitting it into an auxiliary volume and an intermediate volume. The intermediate volume is comprised between the first stabilisation membrane and the second stabilisation membrane for containing a fluid at a pressure substantially equal to the atmospheric pressure value.

Advantageously, the stabilisation membranes allow defining an intermediate volume in which there is no fluid, but only air at a pressure equal to the atmospheric pressure. In this way, pressing forces are only applied to the first stabilisation membrane by the fluid coming from the outlet passage, avoiding compromising its operation.

According to one aspect of the invention, the actuating means comprises an actuating shaft extending along the movement direction at least from the auxiliary volume towards an operating end arranged in the main volume.

Preferably, the actuating means comprises a tubular element extending along the movement direction within which the actuating shaft is inserted for placing the main volume in fluid connection with the auxiliary volume.

Advantageously, the tubular element allows the movement of the actuating shaft along the movement direction. However, this tubular element allows the passage of part of the fluid coming from the inlet passage towards the secondary volume. The presence of the second stabilisation membrane allows confining this amount of fluid in the auxiliary volume, preventing it from flowing towards the intermediate volume where it would come into contact with the first stabilisation membrane.

According to one aspect of the invention, on the side facing towards the secondary volume of the connection portion a flat surface is present which is orthogonal to the axis of extension exposed to the pressure of the fluid so as to apply a thrust pressure on the shutter towards the closed position. For example, in the case in which the second stabilisation membrane is damaged, the presence of a flat surface of separation between the connecting portion of the membrane and the fixed portion of the valve allows the fluid to infiltrate therein. As a function of the pressure of the fluid, the first stabilisation membrane (kept firmly in its position by its connecting portion constrained to the valve and by the presence of the elastic element) is movable along the movement direction in such a way as to apply a pressing force on the shutter via the elastic element that keeps it in the closed position.

Preferably, the connecting portion has a blind cavity defined in part by the side of the first stabilisation membrane facing towards the secondary volume for containing a quantity of fluid infiltrated between the first stabilisation membrane and the fixed portion so as to apply a thrust pressure on the shutter towards the closed position.

The fluid infiltrated between the membrane and the fixed portion is advantageously stored in the blind cavity in order to apply the necessary pressing force on the shutter to keep it in the closed position.

According to one aspect of the invention, the valve comprises a rigid cover of the stabilisation membrane interposed between the stabilisation membrane itself and the elastic element. The rigid cover is superposed on the stabilisation membrane and is movable along the movement direction as a function of the quantity of fluid stored in the blind cavity to assist the elastic element in maintaining the shutter in the closed position.

Advantageously, as the rigid cover is not constrained to anything but merely superposed on the membrane and interposed with the elastic element, it provides protection to the first stabilisation membrane and is able to more efficiently apply the pressing force on the shutter induced by the quantity of fluid infiltrated into the blind cavity.

According to another aspect of the invention, the actuating shaft passes through the second stabilisation membrane, the first stabilisation membrane, the rigid cover and the shutter.

According to a further aspect of the invention, the valve comprises magnetic activation means operatively active on a movement end of the actuating shaft opposite the operating end for moving said actuating shaft along the movement direction.

A valve comprises two stages, wherein at least a second stage has at least any one of the features previously introduced.

Preferably, a first stage comprises a further shutter arranged in the primary volume and movable along the movement direction between a flow position and a locked position. In the flow position the further shutter allows the passage of the fluid towards the shutter, while in the locked position the further shutter prevents the passage of the fluid.

According to one aspect of the invention, the valve comprises a tertiary volume interposed between the shutter and the further shutter. This tertiary volume has an inlet opening in fluid communication with the inlet passage and an outlet opening in fluid communication with the outlet passage. The shutter abuts on the outlet opening when it is in the closed position, while the further shutter abuts on the inlet opening when it is in the locked position.

Preferably, the actuating shaft is common to both of the shutters and is configured to move the shutter and the further shutter. The actuating shaft is inserted in the tertiary volume so that the operating end interacts with the further shutter.

Advantageously, the movement member is configured to be able to move the shutter and the further shutter. Each shutter is independent with respect to the other, so as to be able to obtain every possible configuration of the positioning of the shutters according to need.

BRIEF DESCRIPTION OF THE DRAWINGS

Additional features and advantages of the present invention will become more apparent from an approximate, and thus non-limiting, description of a preferred, but non-exclusive embodiment of a valve for fluids, preferably for gases, as illustrated in the appended drawings, in which.

With reference to the drawings, they serve solely to illustrate embodiments of the invention with the aim of better clarifying, in combination with the description, the inventive principles at the basis of the invention.

DETAILED DESCRIPTION OF PREFERRED EMBODIMENTS OF THE INVENTION

The present invention relates to a valve for fluids, preferably for gases.

With reference to the figures, a valve for fluids, preferably for gases, has been generically indicated with the number 1.

The other numerical references refer to technical features of the invention which, barring indications otherwise or evident structural incompatibilities, the person skilled in the art will know how to apply to all the variant embodiments described.

Any modifications or variants which, in the light of the description, are evident to the person skilled in the art, must be considered to fall within the scope of protection established by the present invention, according to considerations of technical equivalence.

Figure 1:
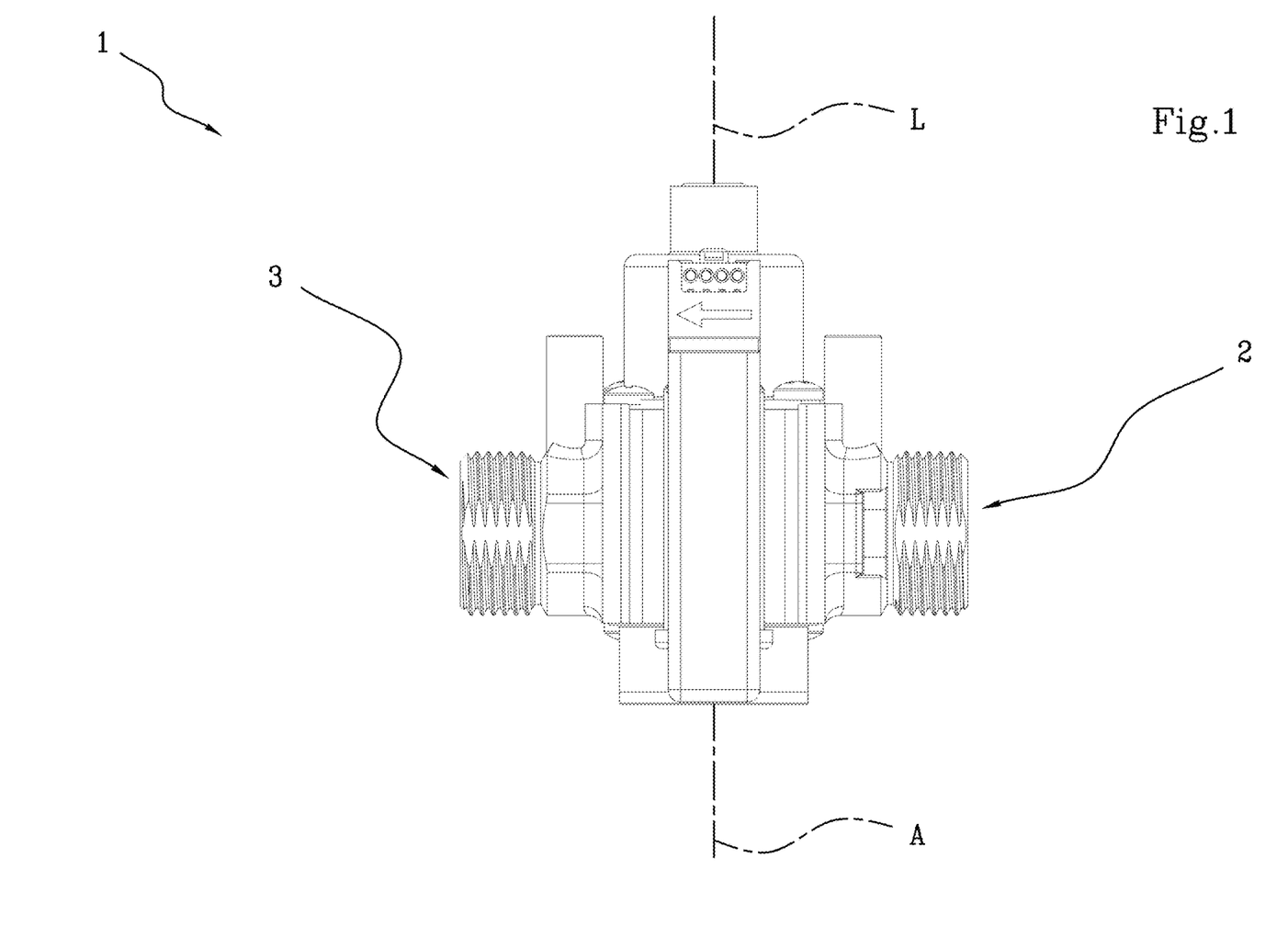
FIG. 1 shows a front view of a valve for fluids.

FIG. 1 shows a valve 1 for fluids, preferably for gases, comprising two consecutive and independent stages, which manage the passage of the predetermined fluid through the valve 1.

Figure 2:
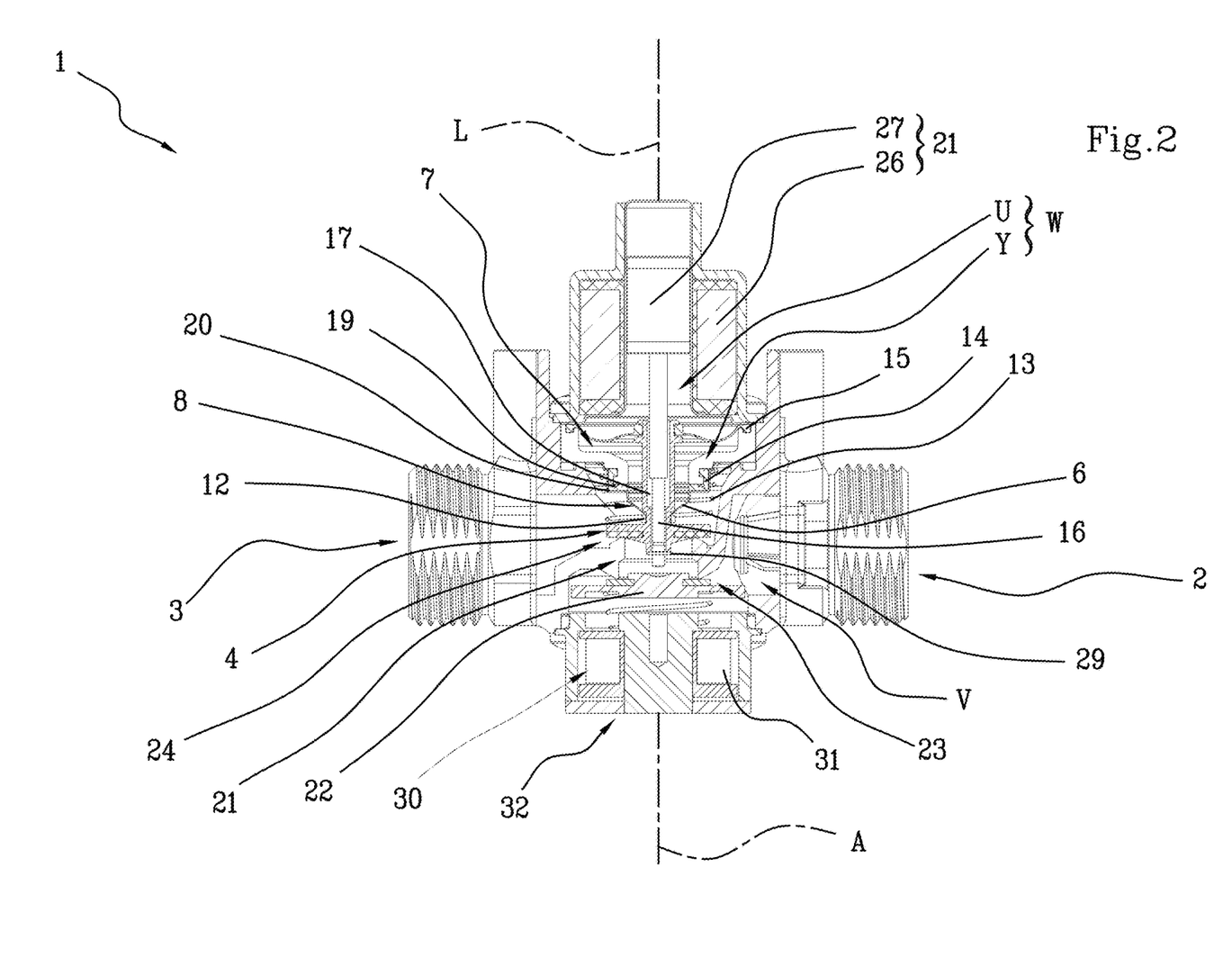
FIG. 2 shows a front view of a section along a transverse plane, of a first embodiment of the valve for fluids.

The second stage of the valve 1, as shown in FIG. 2, comprises an inlet passage 2 and an outlet passage 3 for the fluid between which a primary volume V is defined, a shutter 4 interposed between these passages and movable along a movement direction L between an open position and a closed position. In the open position the shutter 4 allows the flow of the gas from the inlet passage 2 to the outlet passage 3 along a sliding direction, while in the closed position the shutter prevents the flow of the gas.

Furthermore, the second stage comprises actuating means 5 movable along the movement direction L and operatively active on the shutter 4 for moving the shutter into the open position, and a first stabilisation membrane 6 interposed between the shutter 4 and a fixed portion 7 of the valve 1 in such a way as to expose an active wall 8 to the fluid present between the outlet passage 3 and the shutter 4.

Figure 7:
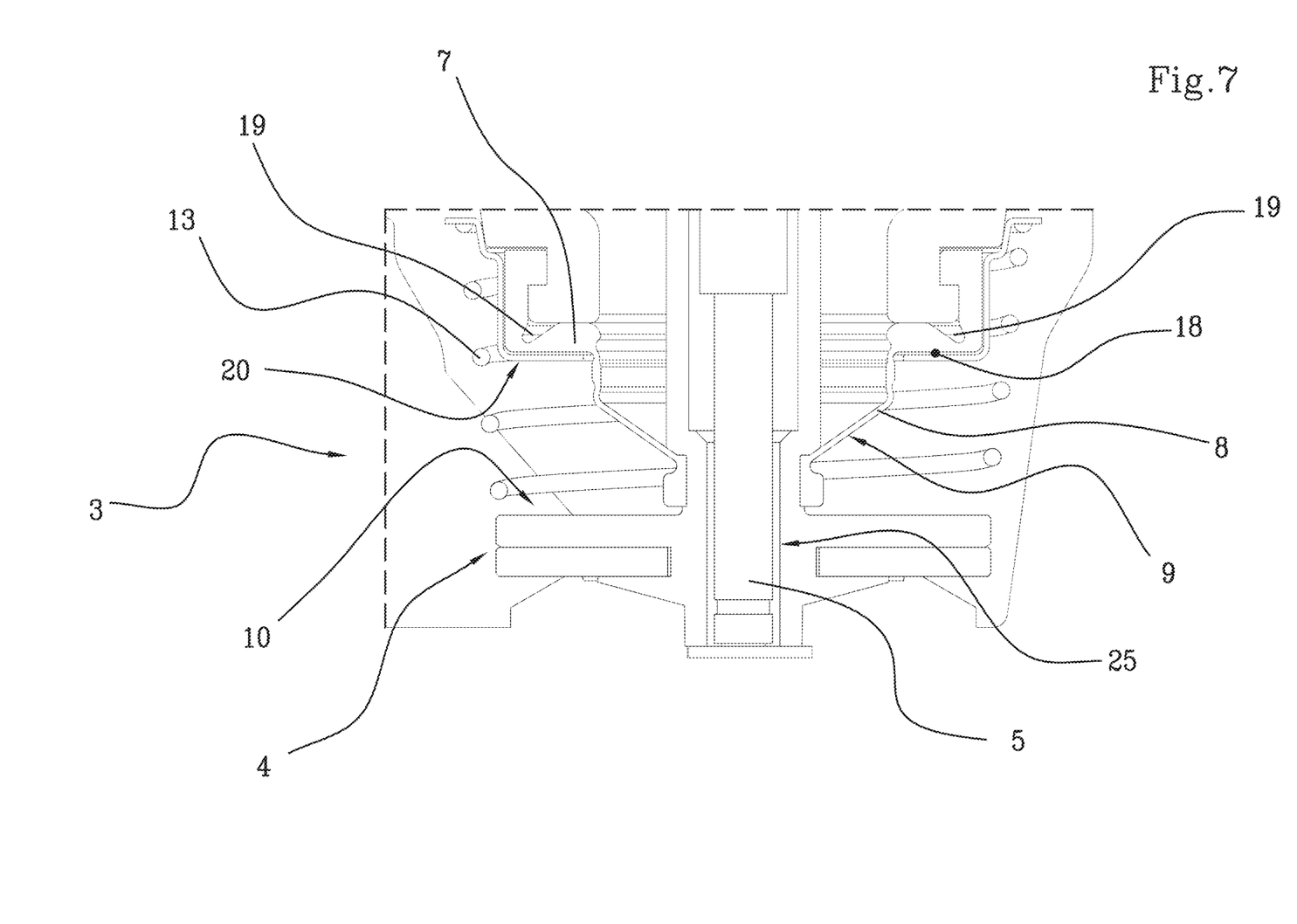
FIG. 7 shows a front view of an enlargement with some parts removed to better highlight others, of a portion of the valve for fluids sectioned along a transverse plane.

Specifically, as can be better seen in FIG. 7, the active wall 8 has an outer surface 9 arranged at the outlet passage 3 and facing towards a rear surface 10 of the shutter 4, which is opposite the inlet passage 2 of the valve 1. The outer surface 9 is conformed so that the force due to the pressure of the fluid acting on the active wall 8 is less than the force due to the pressure of the fluid acting on the rear surface 10 of the shutter 4, so as to prevent the pressurised fluid from being able to open the shutter 4 when the latter is in the closed position and the valve 1 is at the same time in a back pressure condition, i.e. a condition in which the fluid flows from the outlet passage 3 towards the inlet passage 2.

In addition, the second stage of the valve 1 comprises a secondary volume W arranged along the movement direction L and separated from the primary volume V by the first stabilisation membrane 6.

Advantageously, the shutter 4 has a through hole configured to put the secondary volume W in fluid connection with the inlet passage 2 when the same shutter 4 is in the closed or open position and when the valve 1 is under a normal pressure condition. Even more advantageously, the actuating means 5 comprises an interstitial space 25 in fluid communication with the through hole to define the passage of the fluid towards the secondary volume W.

Figure 3:
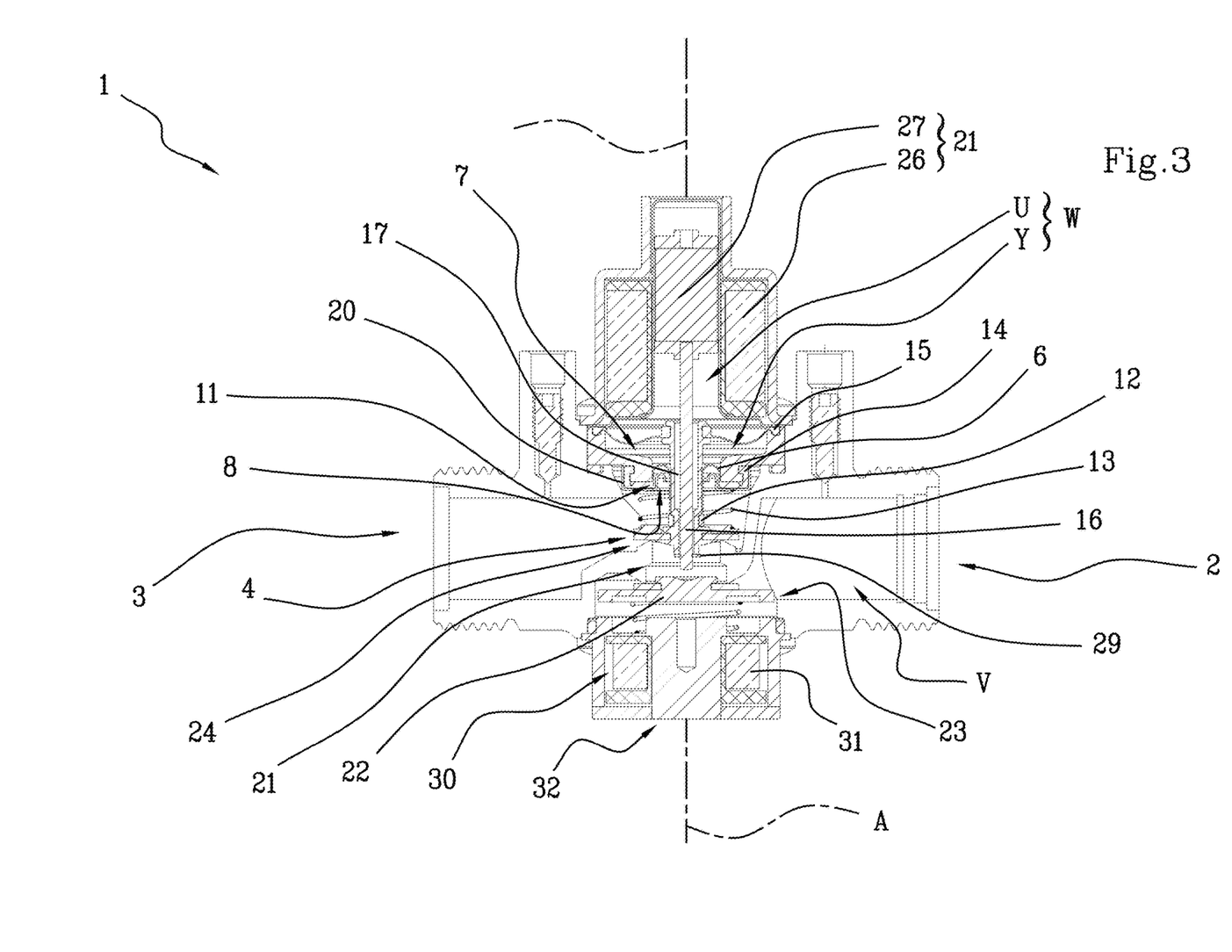
FIG. 3 shows a front view of a section along a transverse plane, of a second embodiment of the valve for fluids.

FIG. 2 and FIG. 3 also show the first stage of the valve 1, which comprises a further shutter 22 interposed between the passages 2,3 and movable along the movement direction L between a flow position and a locked position. In the flow position the further shutter 22 allows the passage of the gas towards the shutter 4, while in the locked position it prevents this passage of gas. Further actuating means 30 are connected to the further shutter 22 which are controlled by an electromagnet 31 arranged in a suitable box-shaped body 32 partially inserted in the valve 1. The box-shaped body 32 is arranged along the movement direction L outside the valve 1.

A tertiary volume M is defined between the shutter 4 and the further shutter 22 that is part of the primary volume V, which has an inlet opening 23 in fluid communication with the inlet passage 2 and an outlet opening 24 in fluid communication with the outlet passage 3. In this way, the shutter 4 abuts on the outlet opening 24 when it is in the closed position, while the further shutter 22 abuts on the inlet opening 23 when it is in the locked position.

The tertiary volume M extends along the movement direction L, so that the inlet opening 23 and the outlet opening 24 are arranged transversally with respect to the inlet passage 2 and the outlet passage 3. Consequently, the flow of the gas does not follow a linear path when passing from the inlet passage 2 to the outlet passage 3.

According to one aspect of the invention, in normal use conditions of the valve 1, the gas is able to flow through the primary volume V when the shutter 4 is in the open position and the further shutter 22 is in the flow position.

However, when the further shutter 22 abuts in the open position, part of the gas is able to reach the secondary volume W.

According to one aspect of the invention shown in FIG. 2, the valve 1 comprises a second stabilisation membrane 15 arranged snap-fitted into the secondary volume W for splitting it into an auxiliary volume U and an intermediate volume Y. More precisely, therefore, the gas is able to reach the auxiliary volume U.

In this way, the intermediate volume Y, defined between the first stabilisation membrane 6 and the second stabilisation membrane 15, contains only air at a pressure equal to the atmospheric pressure. According to this aspect of the invention, the tubular element 17 puts the primary volume V in fluid communication with the auxiliary volume U.

Consequently, under normal conditions, the first stabilisation membrane 6 receives stresses only on its outer surface 9, i.e. that turned towards the outlet passage 3.

According to one aspect of the invention, the actuating means 5 extends along an axis of extension A parallel to the movement direction L.

More precisely, the actuating means 5 comprises an actuating shaft 16 and a tubular element 17, both extending along the movement direction L between the main volume V and the secondary volume W.

Even more precisely, the tubular element 17 is hollow to allow the insertion of the actuating shaft 16. In order to allow the sliding, the transverse section of the actuating shaft 16 is equal to, or preferably less than, the transverse section of the tubular element 17. In this way, when the further shutter 22 is in the flow position, the tubular element 17 puts the primary volume V in fluid communication with the secondary volume W.

In other words, between the actuating shaft 16 and the tubular element 17 an interstitial space 25 is defined, thanks to which the gas flows towards the secondary volume W.

Advantageously, when the shutter 4 is in the closed position and at the same time the gas flows between the inlet passage 2 and the outlet passage 3, the interstitial space 25 allows obtaining a balancing of the pressures induced on the shutter 4 and a second stabilisation membrane 15 arranged snap-fitted in the secondary volume W. In particular, the interstitial space 25 allows part of the gas to flow from the inlet passage 2 toward the secondary volume W, filling it, and causing a thrust pressure on the second stabilisation membrane 15 equal and opposite the thrust pressure normally induced on the shutter 4 in order to counteract it.

According to a preferred aspect of the invention, the actuating shaft 16 is common to both shutters 4,22 and is configured to move them independently with respect to one another.

Specifically, the actuating shaft 16 passes through the second stabilisation membrane 15, the first stabilisation membrane 6 and the shutter 4.

More precisely, the actuating shaft 16, inserted through the tubular element 17, extends at least from the secondary volume W towards an operating end arranged in the main volume V. This operating end is used to move the further shutter 22 from the flow position to the locked position.

While the actuating shaft 16 moves the shutter 4 in the open position, an elastic element 13 is interposed between the fixed portion 7 of the valve 1 and the shutter 4 to move it in the closed position. Preferably, the first stabilisation membrane 6 has a connecting portion 14 arranged between the elastic element 13 and the fixed portion 7 of the valve 1.

Similarly, the actuating shaft 16 moves the further shutter 22 in the flow position, while a spring is able to reposition it in the locked position.

The movement of the actuating means 5 along the movement direction L is ensured by the magnetic activation means 21 operatively active on one end of the movement of the actuating shaft 16 opposite the operating end.

Specifically, the magnetic activation means 21 comprises an electromagnet 26 and a magnetic body 27 connected to the movement end of the actuating shaft 16, which is made of a magnetic and/or ferromagnetic material. The electromagnet 26, integral with respect to the valve 1, is capable of generating a magnetic field such as to interact with the magnetic body 27 to move it and/or keep it in position along the movement direction L.

Alternatively, according to a different aspect of the invention not shown in the appended figures, the electromagnet 26 is connected to the movement end of the actuating shaft 16 (preferably by means of a connection of the voice-coil type), while the magnetic body is rigidly integral with the valve 1, in this way the magnetic field produced by the electromagnet 26 will directly move the latter along the movement direction L.

Figure 4:
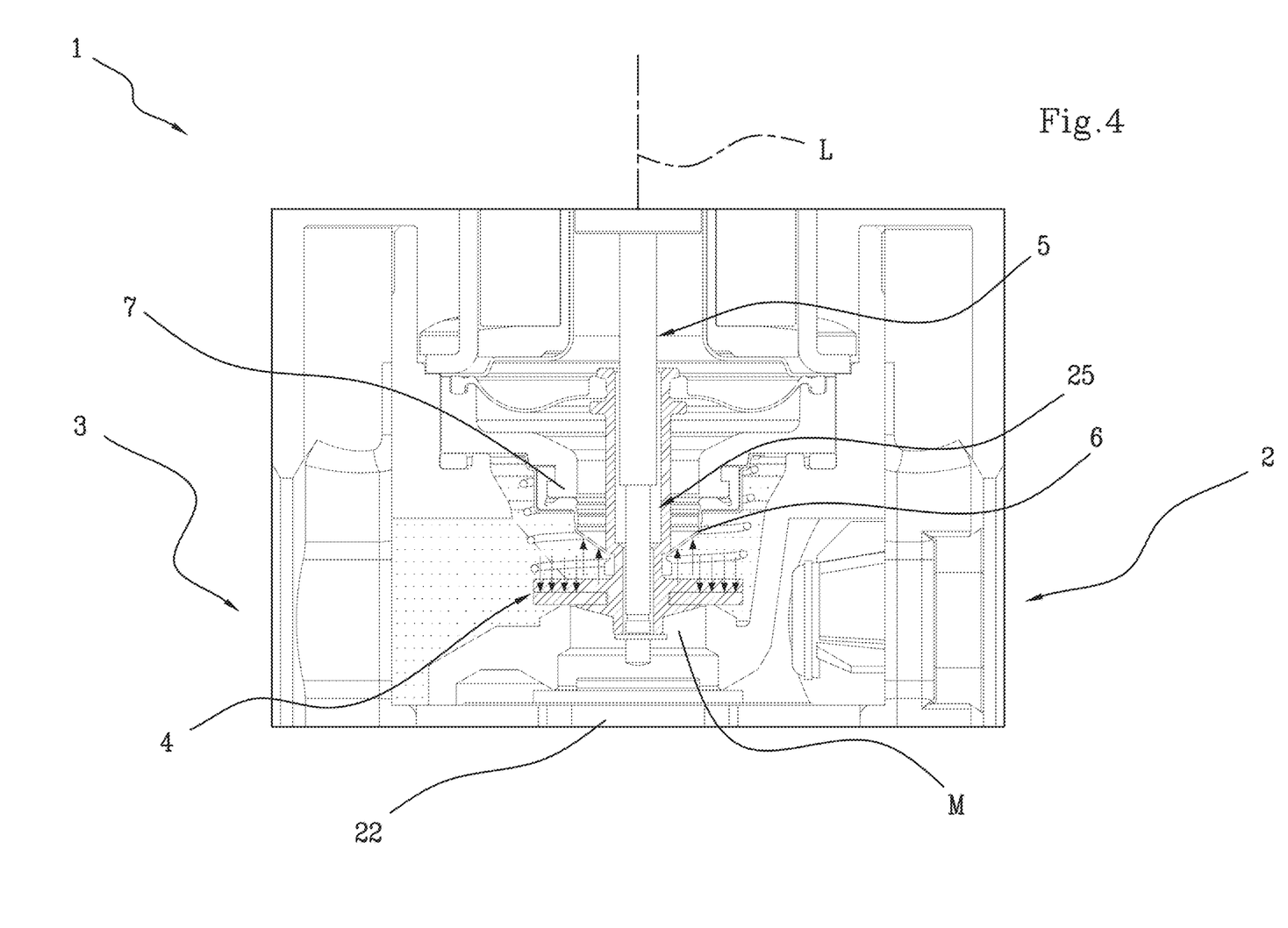
FIGS. 4 and 5 show a side view of a section along a transverse plane, as the pressure induced by the fluid acts on the membranes and on the shutter of the valve during back pressure tests.
Figure 5:
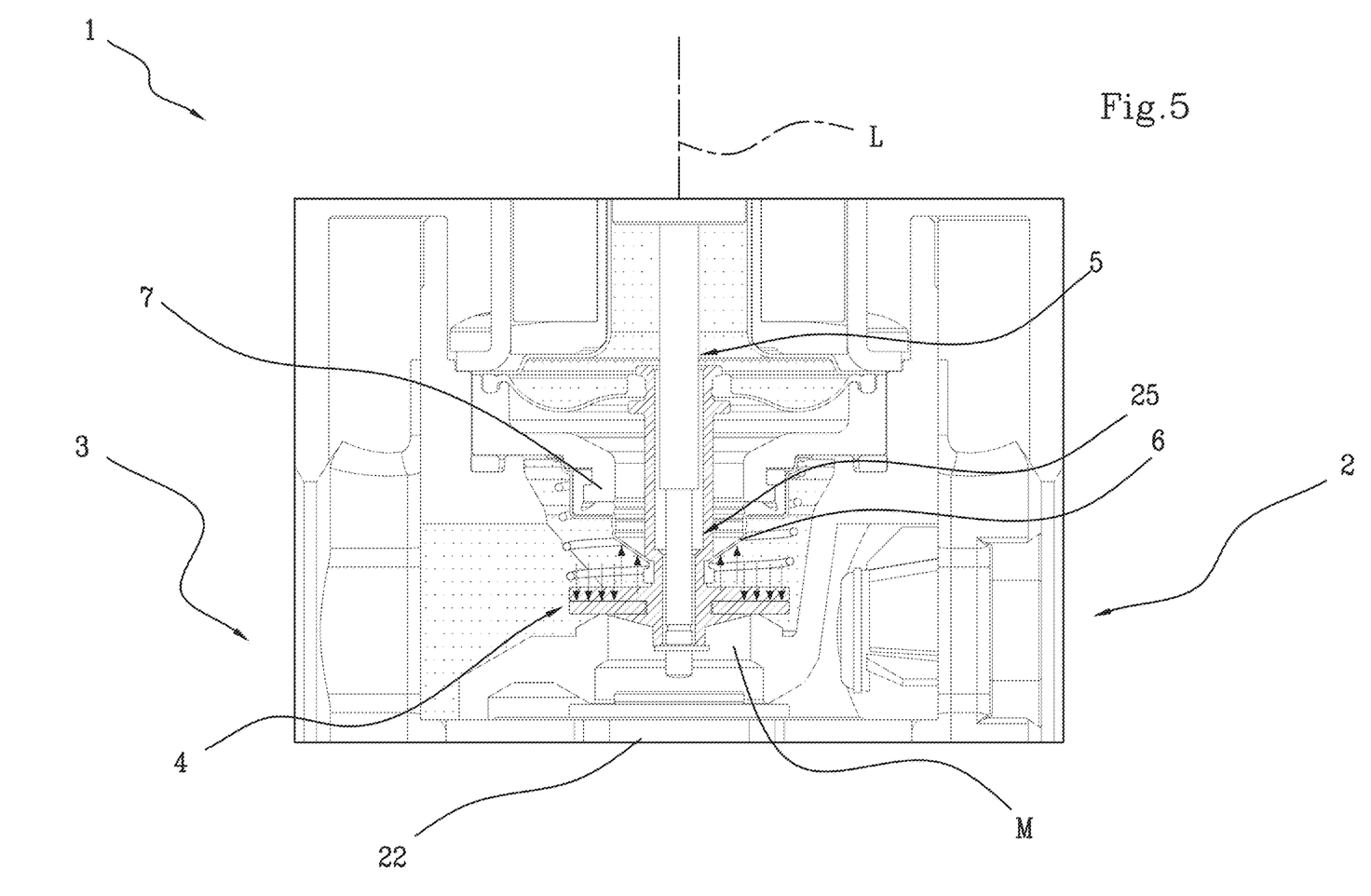
Figure 6:
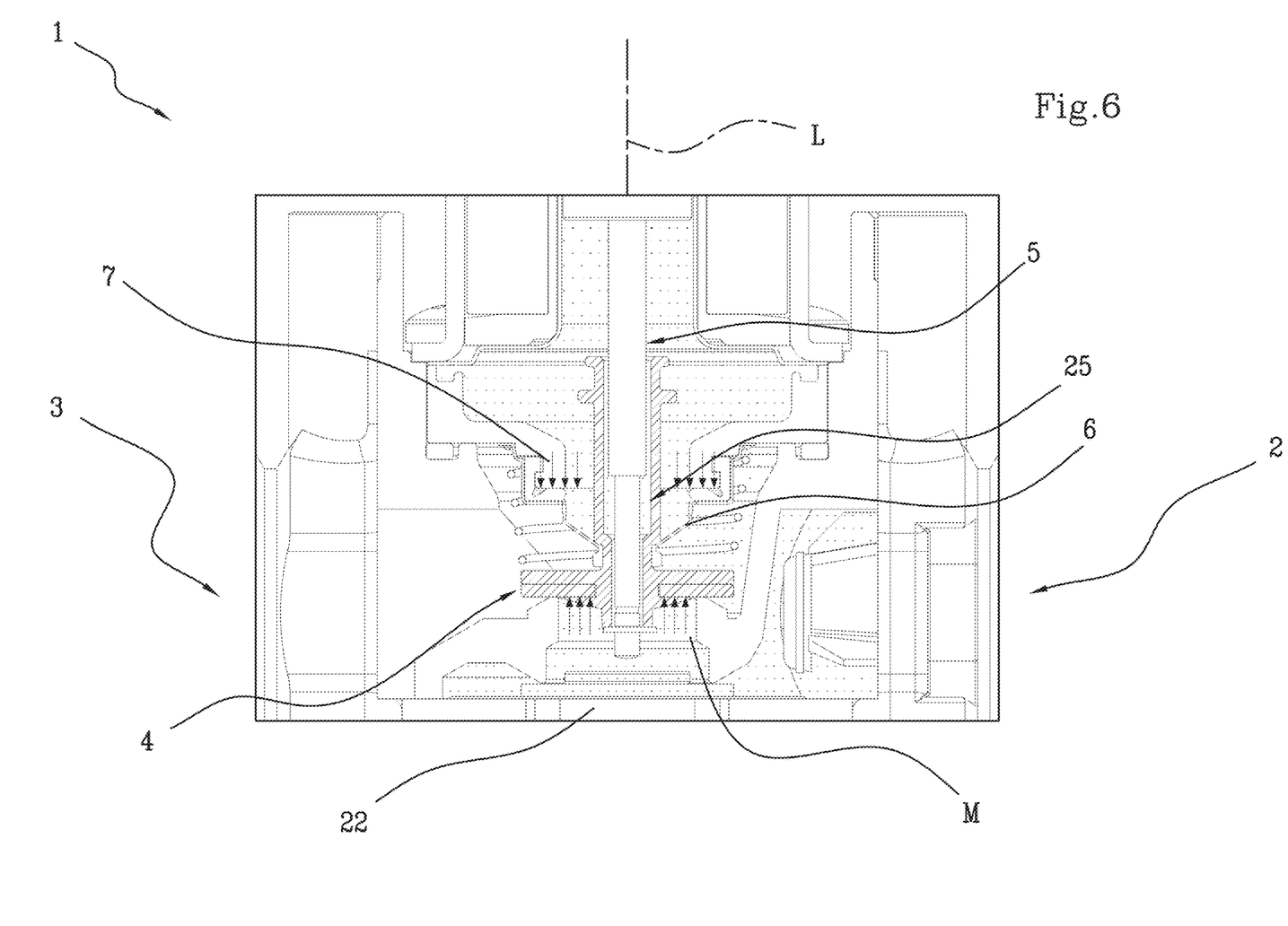
FIG. 6 shows a side view of a section along a transverse plane, as the pressure induced by the fluid acts on the membranes and on the shutter of the valve during the test in which the second stabilisation membrane is removed and with a flow of fluid from the inlet passage towards the outlet.

As shown in FIGS. 4 to 6, in the back-pressure condition, i.e. the flow of the gas from the outlet passage 3 towards the inlet passage 2, the pressing force that the gas exerts on the membrane increases with respect to normal conditions. The valve 1, under this condition of greater stress, must be able to ensure an isolation of the outlet passage 3 from the rest of the primary volume V.

To this end, the first stabilisation membrane 6 comprises a sleeve 12 arranged adjacent to at least part of the actuating means 5 for being constrained to the latter at the shutter 4 and define a physical separation of the main volume V when the shutter 4 is in the closed position. Specifically, the stabilisation membrane 6 surrounds the axis of extension A of the actuating means 5 and lies on a plane substantially orthogonal to the axis itself.

According to a first aspect of the valve 1 shown in FIG. 2, the active wall 8 of the first stabilisation membrane 6 is preferably, but not necessarily, inclined with respect to the axis of extension A towards a common portion of the shutter 4, assuming the shape of a cone or a truncated cone.

Preferably, the first stabilisation membrane 6 is of the bellows type to follow the movement of the actuating means 5 along the movement direction L. More precisely, the stabilisation membrane 6 has a bellows portion arranged between the active wall 8 and the connecting portion 14.

According to a different aspect of the invention that can be seen in FIG. 3, the active wall 8 has a concavity 11 that extends away from the shutter 4 substantially along the movement direction L.

FIG. 6 shows the valve 1 for fluids in which there is no second stabilisation membrane 1, in order to simulate the possibility that this membrane is malfunctioning, not ensuring a clear separation of the secondary volume W.

In this case, therefore, the gas present in the auxiliary volume U infiltrates into the intermediate volume Y, inducing a significant pressure on an inner surface of the first stabilisation membrane 6.

According to one aspect of the invention, on the side of the connecting portion 14 facing towards the secondary volume W, a flat surface 18 is present that abuts on the fixed portion 7 of the valve 1. The flat surface 18 is orthogonal with respect to the axis of extension A and is exposed to the pressure of the gas in such a way as to apply a thrust pressure on the shutter 4 towards the closed position.

In other words, the gas of the secondary volume W is able to infiltrate along the flat surface 18, between the fixed portion 7 and the connecting portion 14, to generate a pressure on the stabilisation membrane 6 at the connecting portion 14, and therefore cause a deformation of the latter. In this way the pressure induced by the infiltrated gas along the flat surface 18 moves the rigid cover 20 resting on the stabilisation membrane 6 to increase the actual load applied by the elastic element 13 on the shutter 4. Specifically, as can be better seen in FIG. 7, the area of infiltration of the connecting portion 14 at the flat surface 18 can be deformed thanks to the lightened conformation present on the peripheral part of the stabilisation membrane 6 itself.

Preferably, the connecting portion 14 has a blind cavity 19 which extends towards the primary volume V.

More precisely, the blind cavity 19 is substantially shaped like a recess that substantially propagates towards the rigid cover 20.

Consequently, the blind cavity 19 is able to contain a determined amount of infiltrated gas between the stabilisation membrane 6 and the fixed portion 7 so as to apply the thrust pressure on the shutter 4 towards the closed position.

According to the aspect just described, the gas in the intermediate volume Y is advantageously directed between the connecting portion 14 of the first stabilisation membrane 6 and the fixed portion 7 of the valve 1, more precisely in the specially afforded blind cavity 19. In this way, the pressure produced by the gas from the secondary volume W towards the primary volume V, which would tend to move the membrane along the movement direction L towards the primary volume V, is transmitted to the elastic element 13, which in turn imparts a pressure on the rear surface 10 of the shutter 4, keeping it in the closed position.

Preferably, the valve 1 comprises a rigid cover 20 of the first stabilisation membrane 6, which is interposed between the first stabilisation membrane 6 itself and the elastic element 13.

The rigid cover 16 is superposed on the first stabilisation membrane 6 in such a way as to be movable along the movement direction L as a function of the quantity of fluid stored in the blind cavity 19.

Advantageously, the rigid cover 20, pushed by the gas in the intermediate volume Y through the first stabilisation membrane 6, is capable of imparting a pressing force on the elastic element 13 to keep the shutter 4 in the closed position. At the same time, the rigid cover 20 is capable of providing a protection to the membrane against the damage caused during its use, such as for example the friction produced by the elastic element 13.

With regard to an operating example of the valve 1 for fluids, preferably for gases, it derives directly from what is described above which is referred to below.

Under normal conditions, the further shutter 22 is in the locked position due to the further actuating means 30 preferably through a spring interposed between the box-shaped body 32 and the further shutter 22.

In this condition the gas is able to flow from the inlet passage 2 only to the portion of the inner volume V comprised between the further shutter 22 and the entrance of the inlet passage 2.

The activation of the actuating means 5 allows the movement of the actuating shaft 16 along the movement direction L. When the operating end of the actuating shaft 16 collides with the further shutter 22, the latter moves from the locked position towards the flow position along the movement direction L. At a certain distance from the box-shaped body 32, the field lines generated by the electromagnet 31 of the further actuating means 30 are able to interact with a magnetic and/or ferromagnetic portion of the further shutter 22 so as to cause it to complete its stroke, up to abutting in the flow position in which it is kept.

Advantageously, the actuating shaft 16 passes through the shutter 4 thanks to a suitable cavity present on the latter. In this way, this method does not interfere in any way with the positioning of the shutter 4, the shutter 4 and the further shutter 22 are able to be moved independently from one another.

In this configuration the gas is able to flow to the inside of the tertiary volume M, in which it finds the obstacle of the shutter 4, which is kept in the closed position by the elastic element 13, which is also generally a spring.

As long as the further shutter 22 is kept in the flow position by the electromagnet 31, the magnetic activation means 21 is able to move the actuating shaft 16 along the movement direction L, distancing the operating end from the further shutter 22. In this way, the abutment 29 present on the actuating shaft 16 allows the movement by magnetic interference of the shutter 4, dragging it from the closed position to the open position, counteracting the force exerted by the elastic element 13 on the shutter 4 to hold it in the closed position.

Preferably, the abutment 29 is a circular ring with a greater section of the through cavity of the shutter 24.

In this configuration the gas is able to flow from the tertiary volume M to the outlet passage 3.

Advantageously, the positioning of the shutter 4 is independent from the positioning of the further shutter 22, therefore a possible configuration of the valve provides that the further shutter 22 is in the locked position during the movement of the shutter 4 from the closed position to the open position, in such a way as to only allow the gas contained in the tertiary volume M to flow outside the valve 1 through the outlet passage 3.

Advantageously, the invention allows making the device safer during the back pressure condition, as the first stabilisation membrane is shaped in such a way that the pressure of the gas does not induce a movement of the shutter from the closed position to the open position, allowing the flow of the gas itself towards the inlet passage.

What is claimed is:

1. A valve for fluids or gases, having at least stage comprising:
   an inlet passage and an outlet passage for a fluid within which a primary volume (V) is defined;
   a shutter interposed between the inlet passage and the outlet passage and movable along a movement direction (L) between an open position, in which it allows the flow of the fluid from the inlet passage to the outlet passage, and a closed position, in which it prevents the flow of fluid;
   an actuating means movable along the movement direction (L) and operatively active on the shutter for moving the shutter itself into the open position;

a first stabilization membrane interposed between the shutter and a fixed portion of the valve; said first stabilization membrane being conformed so as to expose an active wall to the fluid present between the outlet passage and the shutter; said active wall having an outer surface arranged at the outlet passage and facing towards a rear surface of the shutter opposite the inlet passage; said outer surface being conformed so that the pressure of the fluid acting on said active wall generates a force that is lower than the force generated by the pressure of the fluid acting on the rear surface of the shutter so as to prevent the fluid opening the shutter, when the shutter is in the closed position and when the valve is in a back pressure condition, in which the fluid flows from the outlet passage to the inlet passage;

wherein the valve further comprises a secondary volume (W) arranged along the movement direction (L) and separated from the primary volume (V) by the first stabilization membrane; said shutter having a through hole configured to put said secondary volume (W) in fluid connection with said inlet passage when said shutter is in the closed position and when the valve has a normal pressure condition; said actuating means comprising an interstitial space in fluid communication with said through hole for the passage of the fluid towards said secondary volume (W), and a second stabilization membrane arranged snap-fitted into the secondary volume (W) for splitting it into an auxiliary volume (U) and an intermediate volume (Y); said intermediate volume (Y) being comprised between the first stabilization membrane and the second stabilization membrane for containing air at a pressure substantially equal to an atmospheric pressure value.

2. The valve according to claim 1, wherein the actuating means extends along an axis of extension (A) parallel to the movement direction (L).

3. The valve according to claim 2, wherein the first stabilization membrane surrounds said axis of extension (A); said first stabilization membrane lying on a substantially orthogonal plane to the axis of extension (A).

4. The valve according to claim 3, wherein the active wall is inclined with respect to the axis of extension (A) moving towards the shutter.

5. The valve according to claim 4, wherein the first stabilization membrane is of the bellows type for following the movement of the actuating means along the movement direction (L).

6. The valve according to claim 3, wherein the active wall has a concavity extending away from the shutter substantially along the movement direction (L).

7. The valve according to claim 1, wherein the first stabilization membrane comprises a sleeve connected to the active wall and arranged adjacent to at least part of the actuating means for being constrained to the latter at the shutter.

8. The valve according to claim 1, comprising an elastic element interposed between the fixed portion of the valve and the shutter for moving and/or keeping the shutter in the closed position.

9. The valve according to claim 8, wherein the first stabilization membrane has a connecting portion arranged between the elastic element and the fixed portion.

10. The valve according to claim 1, wherein said interstitial space and said through hole are configured to put said inlet passage in fluid communication with said auxiliary volume (U) so that the fluid under normal pressure conditions acts on the second stabilization membrane to counterbalance the pressure induced on the shutter.

11. The valve according to claim 1, wherein the actuating means comprises an actuating shaft extending along the movement direction (L) at least from the auxiliary volume (U) towards an operating end arranged in the main volume (V).

12. The valve according to claim 11, wherein the actuating means comprises a tubular element extending along the movement direction (L) within which the actuating shaft (16) is inserted for placing the main volume (V) in fluid connection with the auxiliary volume (U).

13. The valve according to claim 9, wherein the connecting portion on a side facing towards the secondary volume (W) has a flat surface orthogonal with respect to the axis of extension (A) exposed to the pressure of the fluid so as to apply a thrust pressure on the shutter towards the closed position.

14. The valve according to claim 13, wherein the connecting portion has a blind cavity defined in part by the side of the first stabilization membrane facing towards the secondary volume (W) for containing a quantity of fluid infiltrated between the first stabilization membrane and the fixed portion so as to apply a thrust pressure on the shutter towards the closed position.

15. The valve according to claim 14, comprising a rigid cover of the first stabilization membrane interposed between the first stabilization membrane itself and the elastic element; said rigid cover being superposed on the first stabilization membrane and being movable along the movement direction (L) as a function of the quantity of fluid stored in the blind cavity to assist the elastic element in maintaining the shutter in the closed position.

16. The valve according to claim 15, comprising a second stabilization membrane arranged snap-fitted into the secondary volume (W) for splitting it into an auxiliary volume (U) and an intermediate volume (Y); said intermediate volume (Y) being comprised between the first stabilization membrane and the second stabilization membrane for containing a fluid at a pressure substantially equal to the atmospheric pressure value, wherein the actuating means comprises an actuating shaft extending along the movement direction (L) at least from the auxiliary volume (U) towards an operating end arranged in the main volume (V), and wherein the actuating shaft passes through the second stabilization membrane, the first stabilization membrane, the rigid cover and the shutter.

17. The valve according to claim 11 comprising a magnetic activation means operatively active on a movement end of the actuating shaft opposite the operating end for moving said actuating shaft along the movement direction (L).

18. A valve comprising two consecutive and independent stages to manage a passage of fluid through the valve, wherein at least a second stage comprises the characteristics of the stage of the valve according to claim 1.

19. The valve according to claim 18, wherein a first stage comprises a further shutter arranged in the primary volume (V) and movable along the movement direction (L) between a flow position, in which it allows the passage of fluid towards the shutter, and a locked position, in which it prevents the passage of fluid.

20. The valve according to claim 19, comprising a tertiary volume (M) interposed between the shutter and further shutter having an inlet opening in fluid communication with the inlet passage and an outlet opening in fluid communication with the outlet passage; said shutter abutting on said outlet opening when in the closed position; said further shutter abutting on said inlet opening when in the locked position.

21. The valve according to claim 20, wherein the actuating shaft is common to both of the shutters and is configured to move the shutter and the further shutter; said actuating shaft being inserted in the intermediate volume (M) so that the operating end interacts with the further shutter.

22. The valve (1) according to claim 17, wherein said magnetic activation means is placed in the auxiliary volume (U) externally to said intermediate volume (Y).

* * * * *